(12) United States Patent
Liu et al.

(10) Patent No.: US 9,612,130 B2
(45) Date of Patent: Apr. 4, 2017

(54) SYSTEM AND METHOD OF ESTIMATING AVAILABLE DRIVING DISTANCE

(71) Applicant: FORD GLOBAL TECHNOLOGIES, LLC, Dearborn, MI (US)

(72) Inventors: Yimin Liu, Ann Arbor, MI (US); Michael Edward Loftus, Northville, MI (US); Perry Robinson MacNeille, Lathrup Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/503,961

(22) Filed: Oct. 1, 2014

(65) Prior Publication Data

US 2016/0097652 A1    Apr. 7, 2016

(51) Int. Cl.
*G01C 21/34*    (2006.01)
*G01C 21/36*    (2006.01)

(52) U.S. Cl.
CPC ..... *G01C 21/3694* (2013.01); *G01C 21/3469* (2013.01)

(58) Field of Classification Search
CPC ............ G01C 21/3469; G01C 21/3415; G01C 21/3492; G01C 21/3697; G01C 21/367; G01C 21/3673; G01C 21/3676; G01C 21/3694; Y02T 10/7005; Y02T 90/161; Y02T 10/7258; Y02T 90/14; B60L 2260/52; B60L 2260/54; B60L 2240/12; B60L 2240/72; B60L 11/184; G08G 1/20
USPC ....................................................... 701/423
See application file for complete search history.

(56) References Cited

U.S. PATENT DOCUMENTS

| | | | |
|---|---|---|---|
| 5,916,298 A * | 6/1999 | Kroiss | B60R 16/0232 701/123 |
| 6,317,686 B1 | 11/2001 | Ran | |
| 8,086,403 B2 | 12/2011 | Ishikawa | |
| 2011/0060495 A1* | 3/2011 | Kono | B60W 40/072 701/31.4 |
| 2011/0178670 A1* | 7/2011 | Perkins | B60K 35/00 701/31.4 |
| 2011/0246061 A1* | 10/2011 | Hayashi | G01C 21/3469 701/533 |

(Continued)

FOREIGN PATENT DOCUMENTS

JP    2007271474 A    10/2007

OTHER PUBLICATIONS

Cox et al., A Bayesian Multiple-Hypothesis Approach to Edge Grouping and Contour Segmentation, International Journal of Computer Vision (1993) pp. 5-24, 11:1, Kluwer Academic Publishers, Manufactured in The Netherlands.

*Primary Examiner* — Muhammad Shafi
(74) *Attorney, Agent, or Firm* — Frank A. MacKenzie; Brooks Kushman P.C.

(57) ABSTRACT

A vehicle includes a powertrain having a battery-powered electric machine. The vehicle also includes a controller programmed to display, on a geographical map, at least one contour line indicating an available driving distance from a current location. The distance of the contour line from the current location is based on energy stored within the battery and predicted energy consumption due to driving along each of a plurality of possible routes originating from the current location. The predicted energy consumption is updated based on energy depletion events that occur during driving.

12 Claims, 6 Drawing Sheets

(56) References Cited

U.S. PATENT DOCUMENTS

| | | |
|---|---|---|
| 2013/0096818 A1 | 4/2013 | Vicharelli et al. |
| 2013/0231798 A1* | 9/2013 | Zurawski ............ B60W 30/182 |
| | | 701/1 |
| 2015/0057916 A1* | 2/2015 | Ishii ................... G01C 21/3469 |
| | | 701/123 |

\* cited by examiner

SYSTEM AND METHOD OF ESTIMATING AVAILABLE DRIVING DISTANCE

TECHNICAL FIELD

The present disclosure relates to battery-powered vehicle powertrain control systems.

BACKGROUND

Vehicles may be propelled by operation of an electric machine configured to receive electrical power from an on-board battery. It is common for the battery to be charged by electrical power from a utility grid or other off-board power source. In circumstances in which the battery is the sole propulsion power source, full depletion of the battery may render the powertrain inoperable. This occurrence may require a time consuming battery recharge.

SUMMARY

In at least one embodiment, a vehicle includes a powertrain having a battery-powered electric machine. The vehicle also includes a controller programmed to display, on a geographical map, at least one contour line indicating an available driving distance from a current location. The distance of the contour line from the current location is based on energy stored within the battery. The position of the contour line is also based on predicted energy consumption due to driving along each of a plurality of possible routes originating from the current location. The predicted energy consumption is updated based on energy depletion events that occur during driving.

In at least one embodiment, a system for indicating available driving distances includes a map display and a controller programmed to, output via the display, at least one contour line enclosing available destinations. The contour line has an appearance feature that is indicative of probability of achieving a driving distance along each of a plurality of routes originating from a current location. The driving distance is based on predicted energy consumption and energy stored in a traction battery.

In at least one embodiment, a method of vehicle range estimation includes mapping a plurality of routes originating from a current location, and locating both high certainty distances and low certainty distance ranges along each of the plurality of routes. The locations of the high certainty distances and low certainty distance ranges are based on energy stored in a traction battery and predicted energy consumption along each route. The method also includes displaying, on a map, contour lines intersecting each of the high certainty distances and the low certainty distance ranges, respectively. The method further includes adjusting the contour lines in response to stochastic energy depletion events that occur during driving.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
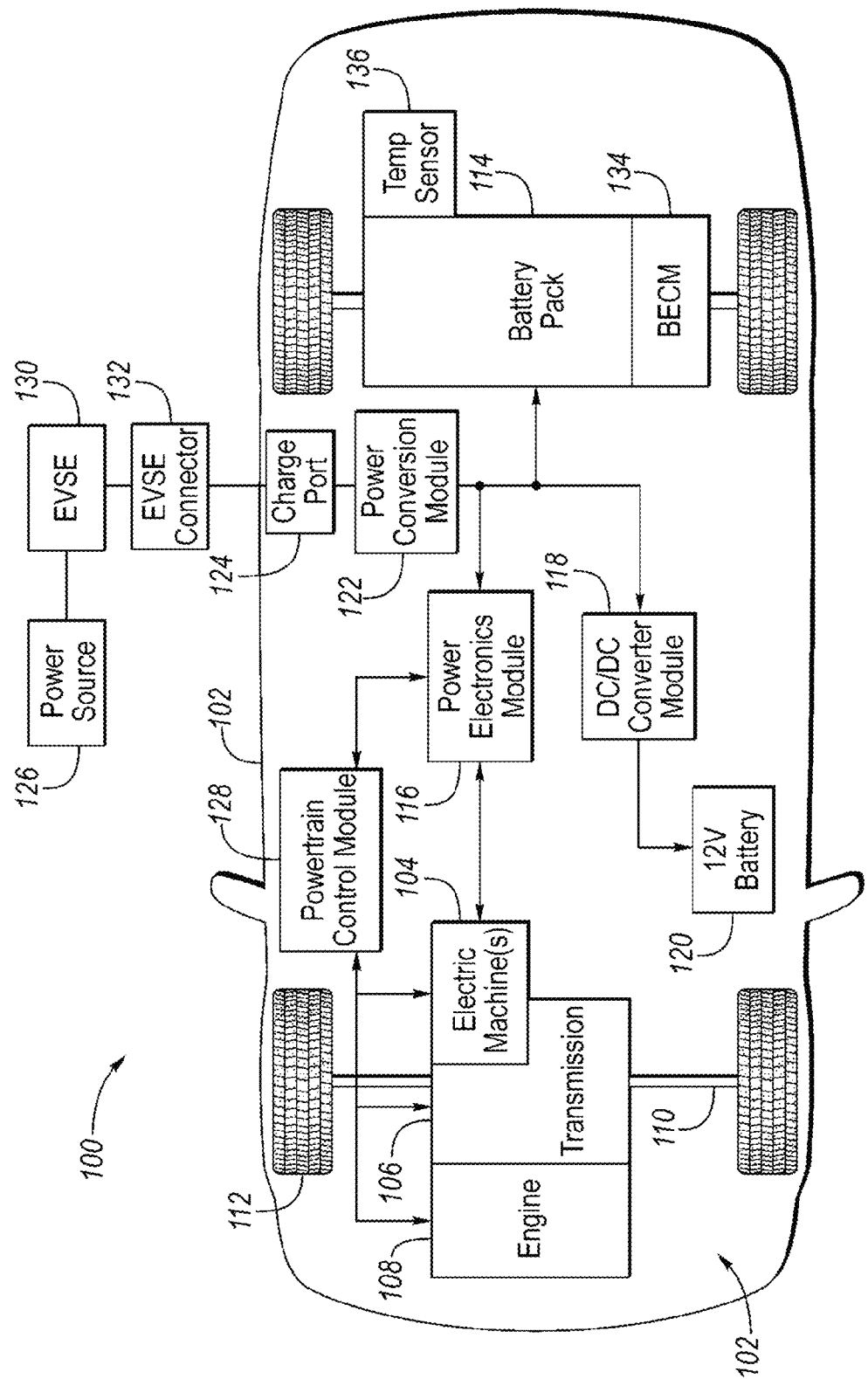
FIG. 1 is a schematic of a vehicle having a battery-powered electric machine.

FIG. 1 depicts an example of a plug in hybrid-electric vehicle 100. A hybrid-electric powertrain 102 may comprise one or more electric motor/generators, or electric machines 104 mechanically coupled to a hybrid transmission 106. In addition, the hybrid transmission 106 is mechanically coupled to an engine 108. The hybrid transmission 106 may also be mechanically coupled to a drive shaft 110 that drives wheels 112. The electric machine 104 can provide vehicle propulsion when the engine 108 is turned on, as well as when the engine is turned off. The electric machine 104 can additionally provide vehicle deceleration by imparting a resistive torque upon the drive shaft. The electric machine 104 may also be configured as an electric generator to provide fuel economy benefits by recovering energy that would normally be lost as heat from the friction braking system. The electric machine 104 may also reduce pollutant emissions since the hybrid electric vehicle 102 may be operated in an electric only powertrain mode under certain conditions.

A battery pack, or traction battery 114, stores energy that can be used to power the electric machines 104. The vehicle traction battery 114 is capable of providing a high voltage DC output. The traction battery 114 is electrically connected to a power electronics module 116. The power electronics module 116 is electrically connected to the electric machines 104, and provides the ability to bi-directionally transfer energy between the traction battery 114 and the electric machines 104. For example, the traction battery 114 may provide a DC voltage while the electric machines 104 may require a three-phase AC voltage to function. In this case, the power electronics module 116 converts the DC voltage to a three-phase AC voltage to be received by the electric machines 104. In a regenerative mode, the power electronics module 116 will convert the three-phase AC voltage from the electric machine 104 acting as a generator to DC voltage as required by the traction battery 114. The methods described herein are equally applicable to a pure electric vehicle or any other device using a battery pack.

The traction battery 114 may provide energy output from one or more battery cell arrays, sometimes referred to as battery cell stacks, within the traction battery 114. The battery cell arrays may include one or more battery cells. The battery cells, such as a prismatic or pouch cell, may include electrochemical cells that convert stored chemical energy to electrical energy. The cells may further include a housing, a positive electrode (cathode), and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a bus bar may assist in facilitating an electrical series connection between the multiple battery cells. The battery cells may also be arranged in parallel such that similar terminals (positive and positive or negative and negative) are adjacent to one another.

In addition to providing battery power for propulsion, the traction battery 114 may provide energy for other vehicle electrical systems. A DC/DC converter module 118 is capable of converting the high voltage DC output of the traction battery 114 to a low voltage DC supply that is compatible with low voltage vehicle loads. Other high voltage loads, such as compressors and electric heaters, may be connected directly to the high-voltage bus from the traction battery 114. Other vehicle systems having a lower electrical load may be electrically connected to a low voltage battery 120. An all-electric vehicle may have a similar architecture but without the engine 108.

The traction battery 114 may be recharged by an external power source 126, for example, such as an electrical outlet. The external power source 126 may be electrically connected to electric vehicle supply equipment (EVSE) 130. The EVSE 130 may provide circuitry and controls to regulate and manage the transfer of electrical energy between the power source 126 and the vehicle 100. The EVSE 130 may also include a charge connector 132 for electrically connecting to a charge port 124. The charge port 124 may be any type of port configured to transfer power from the external power source 126 to the vehicle 102.

The external power source 126 may provide AC or DC power to the vehicle 100 through the charge port 124. The vehicle may also include a power conversion module 122 to condition the power from the external power source 126 and provide the proper voltage and current levels to the traction battery 114. In some applications, the external power source 126 may be pre-configured to provide the proper voltage and current levels to the traction battery 114 such that the power conversion module 122 may not be necessary. For example, the functions of the power conversion module 122 may be contained within the external power source 126. The vehicle powertrain including engine, transmission, electric motors, electric generators and power electronics may be controlled by a powertrain control module (PCM) 128 (vehicle controller).

The vehicle may further include a battery energy control module (BECM) 134 in communication with the traction battery 114. The BECM 134 may act as a controller for the traction battery 114 and may also include electronic monitoring systems that manage temperature and charge state of the battery cells. Therefore the traction battery 114 may also include a temperature sensor 136 such as a thermistor or other type of temperature gauge. The temperature sensor 136 may be in communication with the BECM 134 to provide temperature data regarding the traction battery 114. Although a single temperature sensor is depicted in the schematic of FIG. 1, multiple sensors may be employed to individually monitor separate cells and/or arrays of cells within the traction battery 114.

Other vehicle configurations may benefit from aspects of the present disclosure. In addition to illustrating a plug-in hybrid vehicle, FIG. 1 can be representative of a battery electric vehicle (BEV) configuration if the engine 108 is removed. FIG. 1 could also represent a traditional hybrid electric vehicle (HEV) or a power-split hybrid electric vehicle if the components 122, 124, and 126 that are related to plug-in charging are removed. A further example vehicle configuration which may benefit from aspects disclosed herein is a conventional vehicle having the internal combustion engine 108 as the sole propulsion source. Such a conventional vehicle may not include an electric machine 104 or traction battery 114 to provide vehicle traction.

Energy stored in the traction battery is depleted during driving. Advanced route planning techniques may serve to provide a driver with an estimate of the available range for driving, or distance to empty ("DTE"). Additionally, accurate route planning may serve to allow a powertrain controller to adjust engine operation in view of upcoming load conditions in order to provide the most optimal operating efficiency. Further, it is advantageous to provide a driver with an instantaneous available range for driving in any given direction from the vehicle's current location. This way, the vehicle's current travel capability may be continuously displayed to the driver, based upon each of the stored energy within the battery and the predicted energy to be consumed while driving.

A mathematical model may be used to characterize the energy consumption along a number of different possible routes, each originating from the current vehicle location. Calculating the available driving distance along each of the possible routes generates a plurality of termination points in different directions circumscribing the starting point. Considering a geographic map, interconnecting the termination points generates a contour line that visually illustrates the DTE relative to the current location along any number of routes.

Equation (1) below is an example math model of energy depletion based on vehicle operating conditions.

$$\Delta Energy = V \cdot I \cdot t = (Av^3 + Bv^2 \cdot t + G_e v + D) \cdot t \quad (1)$$

The terms of equation (1) relate to different sources of energy consumption. Each term contributes to the overall energy consumption, and can also be independent sources of variability. Certain terms of equation (1) may be determined directly from data obtained by measuring on-board vehicle operating parameters. Alternatively, certain terms may be determined from fixed data provided to the vehicle controller. These data tend to remain available to the vehicle controller from one trip to the next. For example, V represents the traction battery voltage, I is the traction battery current, v is the vehicle velocity, and t is the duration of time over which energy is depleted during driving. Each of these values is readily measured by onboard sensors.

$G_e$ is energy consumption related to the gradient values encountered during driving, and may be approximated by equation (2) below.

$$G_e = Grade \cdot m \cdot F_r \quad (2)$$

Where Grade is characterized by elevation change per distance traveled. Elevation changes may be determined using known geographical elevation data, and relative differences between various locations. m is total mass, where the vehicle mass is known, and additional passenger mass and cargo mass may be accounted for using an onboard weight sensor for example. $F_r$ is the rolling resistance force, and can be characterized by equation (3) below.

$$F_r = C_{rr} \cdot Normal\ Force \quad (3)$$

Where $C_{rr}$ is a coefficient or rolling resistance that accounts for tire construction, tread materials, and road surface conditions. The Normal Force is the perpendicular load of the vehicle against the road surface. All of the above coefficients can be affected by weather, altitude, traffic, and driver behavior among other factors.

Other coefficients of the energy calculation of equation (1) tend to be more transient and carry significantly more variability. These high variability terms may be derived by regression analysis based on a larger sample of data from the particular subject vehicle or from a collection of vehicles. In at least one embodiment, a plurality of vehicles communicate measured data to each other, and the subject vehicle uses these data to make conclusions regarding states of the transient information.

In equation (1), A is a coefficient indicative of aerodynamic drag, and can be approximated by equation (4) below.

$$A \cong \tfrac{1}{2} \rho A_f C_d \qquad (4)$$

Where $A_f$ is the frontal area of the vehicle. $\rho$ is air density, and in the simplest case is assumed to be constant. Under ordinary conditions $\rho$ can vary as much as 20% across different locations and times. Barometric pressure, temperature, and precipitation each impact air density p, and each fluctuates based on weather changes and altitude. Data from external wireless sources can be used to augment the calculation and correct for variation in air density.

$C_d$ is the vehicle's coefficient of drag, and also fluctuates under different operating conditions. Solving equation (4) above for $C_d$ shows that vehicle speed and wind yaw angle with respect to the vehicle each affect the coefficient $C_d$. The definition of $C_d$ may vary in different applications, but equation (5) below is used according to aspects of the present disclosure.

$$C_d = F_d \div (\tfrac{1}{2} \cdot \rho v^2 A_f) \qquad (5)$$

Where $F_d$ is the force component in the direction of travel. Therefore coefficient A may also be characterized by equation (6) below.

$$A = F_d / v^2 \qquad (6)$$

Figure 2:
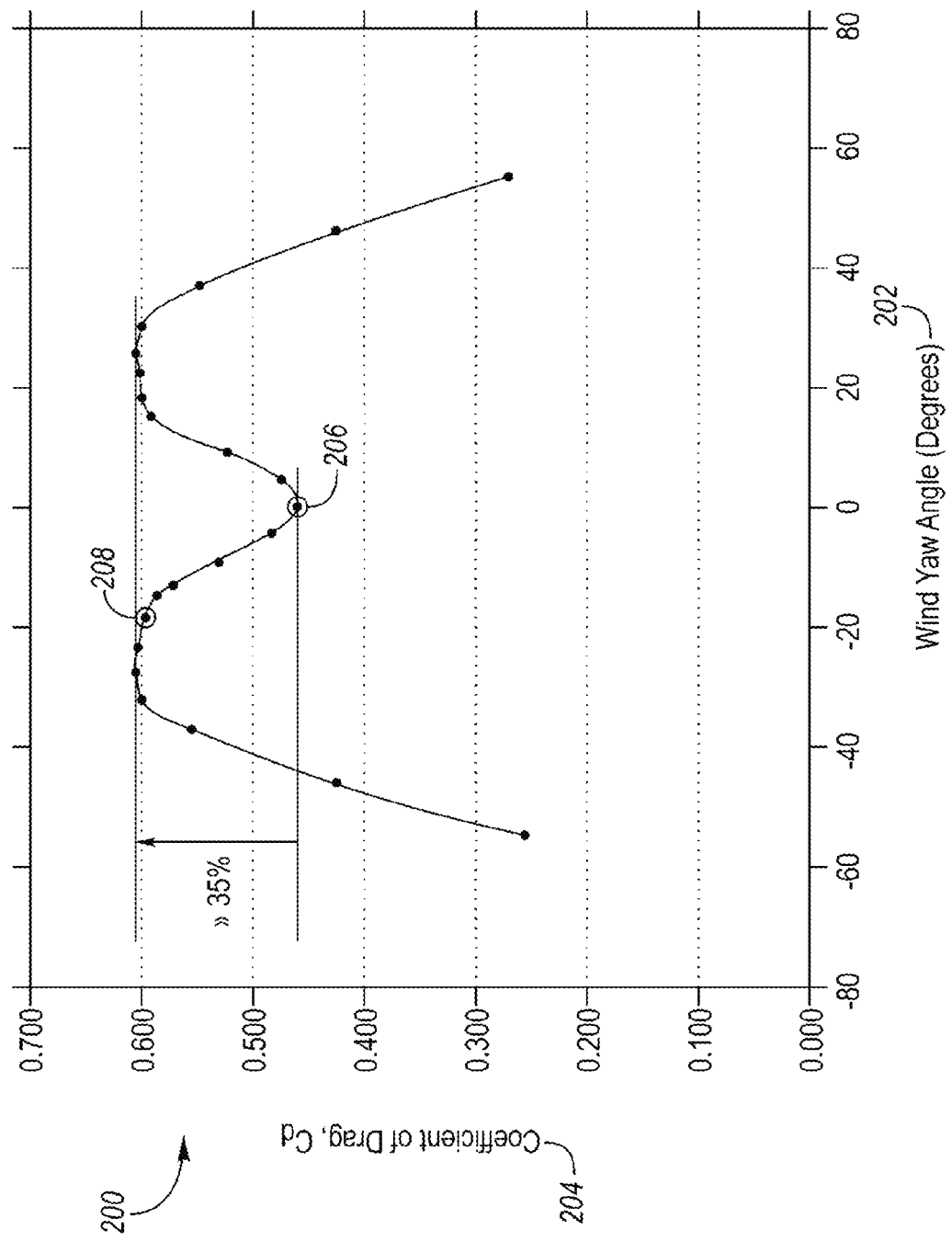
FIG. 2 is a plot of aerodynamic drag versus wind yaw angle.

FIG. 2 is an example plot 200 showing the relationship between wind yaw angle 202 and the coefficient of drag 204 for a particular vehicle. As can be seen from the plot, the drag coefficient may increase by as much as 35 percent between point 206 at about zero degree yaw, and point 208 at about 20 degree yaw angle of wind. As a practical example, a 30 mph vehicle speed combined with a 10 mph cross wind may yield such a yaw condition. Further increase in yaw angle beyond 20 degrees causes the drag coefficient to decrease rapidly as a function of angle. Therefore monitoring patterns of wind speed and wind direction can enhance the accuracy of the estimate of the coefficient of drag.

Referring back to equation (1) above, B is a coefficient indicative of rolling resistance. Much like the previously discussed transient terms, the rolling resistance changes depending on the road surface corresponding to a particular route traveled. Further, B may vary based on changes in overall vehicle curb weight such as changes in number of passengers or cargo mass.

Tire rolling resistance can also be a factor on the overall rolling resistance coefficient B. Barometric pressure and ambient temperature also affect tire inflation which in turn affects rolling resistance. A tire that has been sitting for several hours or more exhibits high rolling resistance during the initial duration of driving. Tire and road materials and materials on the road surface such as rain, snow, ice, etc. also have a large impact. Barometric pressure and ambient air temperature are typically detected by vehicle sensors and used for climate control, engine calibration, as well as displaying weather conditions to vehicle occupants. These values as well as road surface conditions can be obtained from external sources based upon vehicle positioning data. Tire materials can be input and stored in the vehicle network when new tires are installed, or can be obtained from sensors that are built into the tires. There are a variety of sensors that can be built in to a tire or installed when a new tire is installed that report tire pressure and temperature. Vehicle tire pressure sensors may communicate a continuous value indicating actual tire pressure to contribute to the calculation of the rolling resistance coefficient B.

D is a coefficient indicative of electrical load from vehicle accessories and is subject to operation states selected by the driver. In one example, the prediction of the electrical accessory load represented by D may be based on the current state of climate, or historical driver usage patterns.

An energy consumption profile along a predetermined route may be determined by predicting changes in the various inputs described above as they are expect to vary along the route. For example, several data sources allow a prediction of a vehicle velocity profile along a given route. A route along known roads and/or highways will have speed limits which are known in advance. Also, the subject driver may have historical velocity data stored in memory of the vehicle controller. Further, sample velocity data from other vehicles over certain portions of the route may also contribute to deriving a predicted velocity profile for the subject vehicle.

The energy consumption equation, and subsequently the DTE estimation, is further affected by additional discrete events such as signal light timing and continuously variable events such as traffic and weather. Following the prediction of an energy consumption profile along a given route using the base energy equation (1) above, additional modifications may be performed by applying travel data from external sources to enhance the overall model.

Vehicle to vehicle (V2V) communications, as well as vehicle to infrastructure (V2I) communications, may provide data indicative of real time transient conditions in areas near the subject vehicle. In one example traffic pattern data may be communicated to a subject vehicle to inform a predicted travel speed, and/or stopping propensity along a particular route. In turn, these values may serve to adjust the expected travel time. Each of the adjustments may increase the accuracy of the predicted energy consumption profile for the given route.

In an example of V2V communications, the real time proximity and relative movement of other vehicles in the vicinity of the subject vehicle may influence the energy consumption component related to aerodynamic drag. The velocity and travel path of other vehicles may influence both of the velocity and drag of the subject vehicle. More specifically, lane changes performed by other vehicles ahead of the subject vehicle can induce a turbulent air wake negatively affecting the drag of the subject vehicle. Similarly, vehicles engaged in convey driving experience reduced drag effects that positively influence the vehicle range. Although V2V is described by way of example, vehicle movement patterns may be monitored and broadcast by other external sources. In at least one embodiment, the energy consumption profile is modified due to changes to an aerodynamic drag status based data communicated from external sources.

V2I communication can also link to traveler information systems that may have good predictions of events that affect energy consumption en route. Data from an infrastructure source can effectively be used to determine future events that stopping propensity along the route. In one example, a movie theater could broadcast with high accuracy times when shows will conclude, and could update the traveler information system accordingly. In another example, an entertainment venue could broadcast the expected conclusion time of a sporting event that could affect traffic. More specifically, related to the uncertainty in the actual duration of many sporting events, the prediction of the time of conclusion becomes more accurate as the game goes on. In at least one embodiment, the energy consumption profile is modified due to predicted changes in traffic status based data communicated from external sources.

An additional variable that may allow for refinement of the energy consumption profile is changes in vehicle weight along a given route. For example, a vehicle may need to pick up additional passengers or cargo along the route. In this case, a vehicle sensor may indicate the weight increase and adjust the energy consumption calculation, as well as the DTE value, based on the weight change. Increased weight corresponds to a higher energy penalty for stoppages and acceleration from rest along the route. Conversely, a reduction of weight along the route may increase the energy efficiency, and extend the DTE. In a consumer application example, the adjustment could be performed real time such as a trip to the grocery store adding cargo, or a trip to pick up children and equipment from school. In a commercial application example, a shipping company may use known changes in weight to update the DTE continuously as it picks up and delivers packages along a known route.

In many of the cases discussed above, the collection of energy depletion events that may occur along a route exhibit Markov properties. That is, the analysis considers that each of the chain of sequential events is stochastic having an independent probability of occurrence that is not reliant on the occurrence of previous events. However in some cases energy depletion events are compounded such that certain occurrences influence the probability of subsequent events.

In one example, the energy consumption model considers the likelihood of being in sync with timing of traffic lights. A vehicle that arrives at a series of green traffics lights can experience an increased velocity relative the predicted velocity profile for portions of the route. Conversely, stopping at many red traffic lights not only decreases the velocity relative the predicted velocity profile, but also increases the overall time over which the vehicle is running. Often, the color state of the first traffic light in a series of lights is indicative of the color state probability of subsequent traffic lights in the series. In at least one embodiment, the controller may modify the energy consumption profile based on a mapped best case "good luck" scenario indicating arriving at all green traffics lights. A complimentary worst case "bad luck" scenario is also mapped indicating having to stop then go at all red traffic lights. Updating the predicted energy consumption based on the best case and worst case traffic light scenarios may affect the confidence interval of the DTE along each of the routes, both on the initial calculation, as well as ongoing updates during driving.

Figure 3:
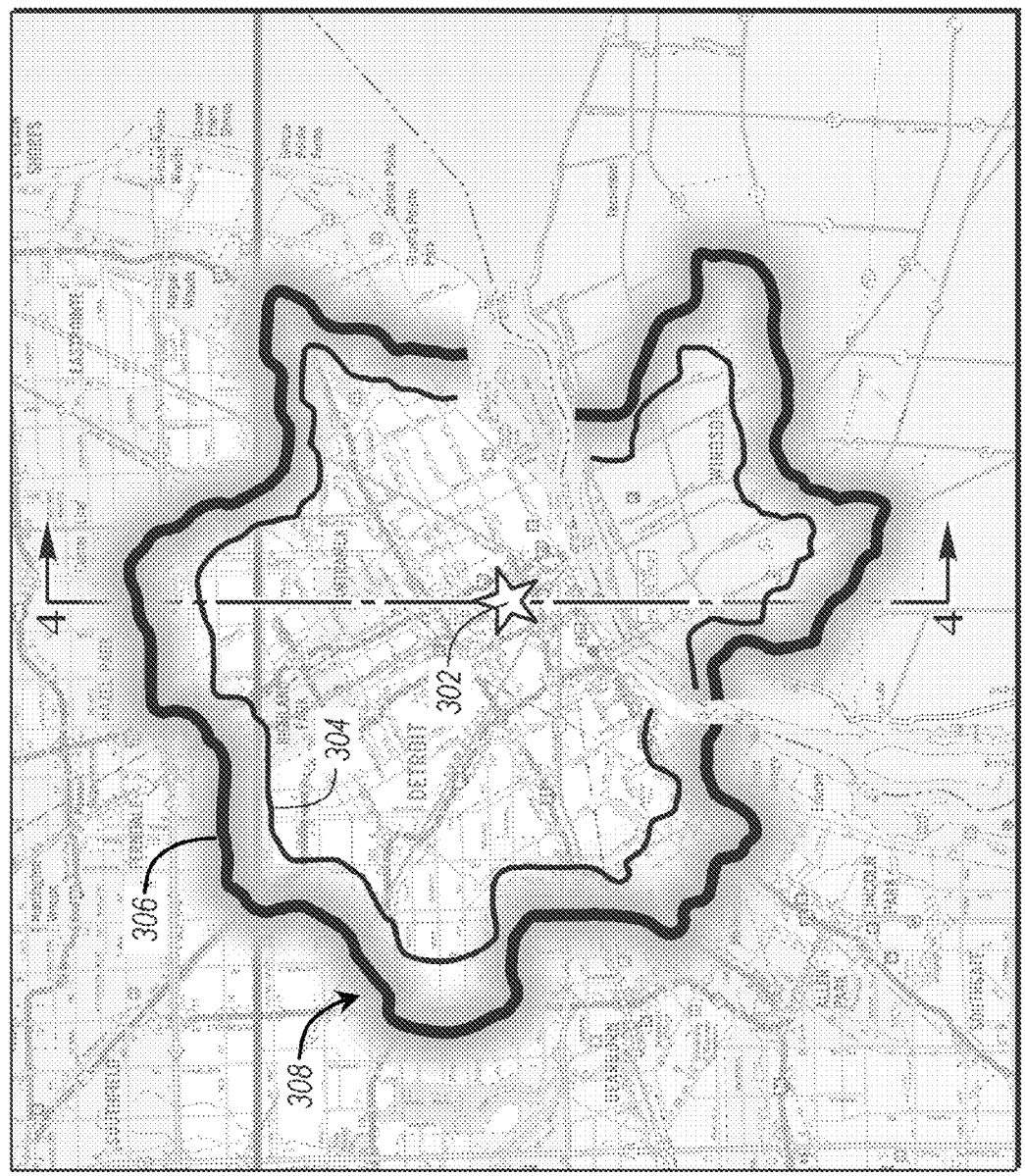
FIG. 3 is a geographical contour map depicting available driving range.

FIG. 3 is an example of a geographical output of the energy consumption model discussed above. A contour map 300 indicates an available travel distance from the current location 302 of the subject vehicle. At least one contour line may be generated to indicate various aspects of DTE. The contours may be constructed by calculating a plurality of possible routes originating from the current location. The routes are constructed in context of the actual roads in the geographical area surrounding the vehicle. Along each route, the controller may generate the predicted energy consumption profile associated with the route as discussed above. The controller may determine, for each route, the distance capable of being driven based on the current energy stored in the battery. The certainty of the prediction is reduced as driving distance from the current location is increased. The locations having corresponding degrees of certainty in each route are connected by a contour line. Generally, the contour lines encircle available destinations relative to the current location based on the current energy stored in the battery.

In the example of FIG. 3, an inner contour line 304 is a high confidence line where there at least about a 99 percent confidence that energy stored within the battery is sufficient to propel the vehicle to geographic destinations within the high confidence line 304. Other numerical confidence thresholds may be suitable to represent a high confidence contour line.

Outside of the inner contour line 304, confidence is reduced, and more vague graphical representations may depict the uncertainty to a driver. An outer contour band 306 is displayed on the contour map 300 to connect low certainty distances from the current location 302 along each of the possible routes. Although the band is shown having a constant thickness, the confidence associated with each route may differ based on the energy consumption variability of particular routes. In at least one embodiment, the width of the confidence bands of the low certainty contours vary around different areas of the map 300.

Different display techniques may further enhance the information provided to the driver. One or more appearance features may be used to indicate the relative probability of arriving at a particular location. In the example of FIG. 3, the low confidence band includes a shaded region 308 adjacent to the outer contour band 306. The distance shading adjacent the outer contour band 306 may additionally correspond to particular confidence values related to the likelihood of arriving at destinations near the fringes of the available driving distance. Further visual enhancements may be employed to communicate range capabilities. For example, the locations of charging stations may be displayed to indicate to the driver which charging stations are within an achievable range based on the current charge. Additionally, the display of geographic map 300 can be masked outside of the shaded region 308 so as not to distract a driver by displaying map data showing geographical areas that are not achievable. Further, although two contour lines are shown, it may be useful to provide a higher number of contours corresponding to the various confidence levels of the available driving range.

Figure 4:
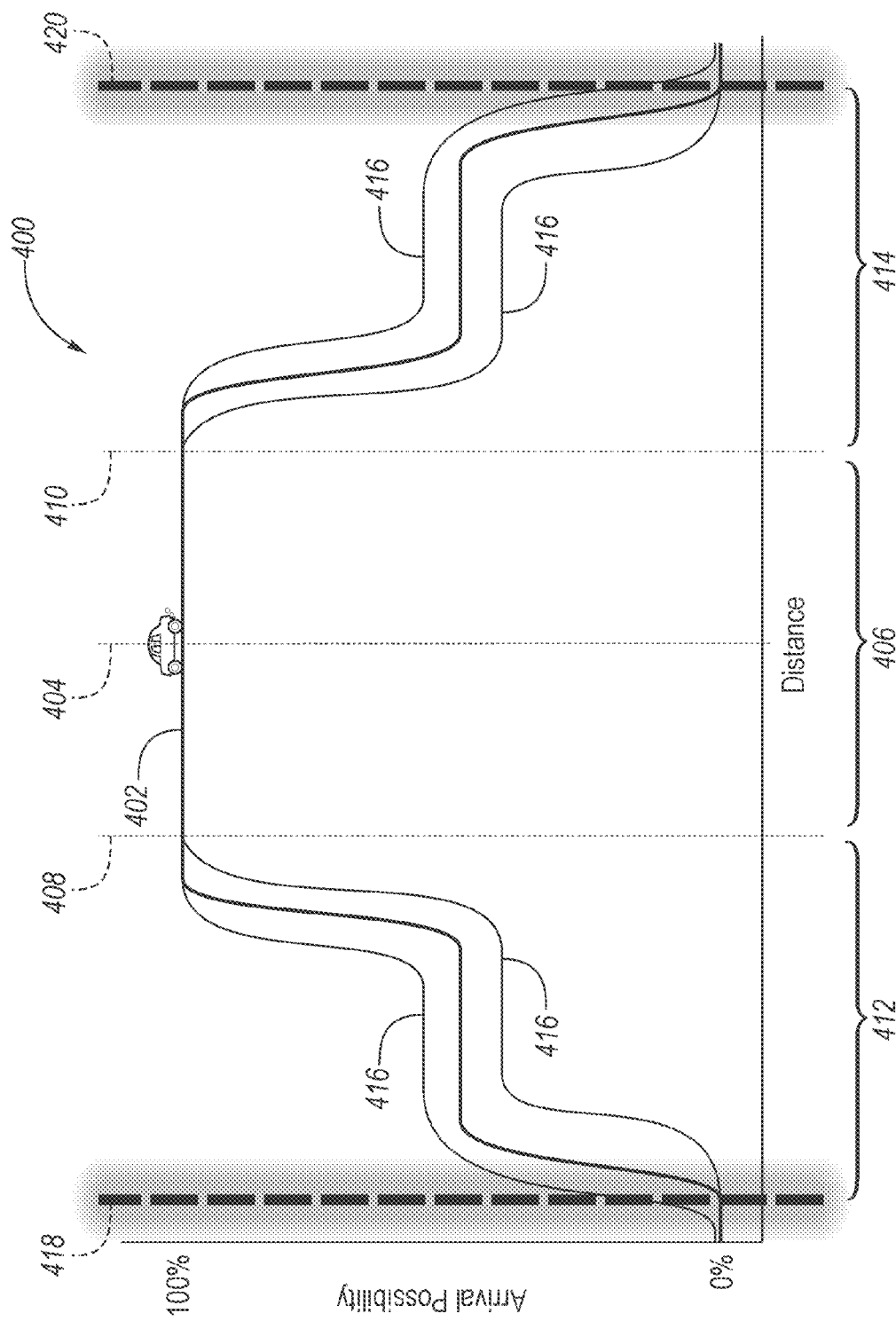
FIG. 4 is an illustrative plot showing changes in arrival possibility along line 4-4 of FIG. 3.

FIG. 4 is a schematic plot 400 corresponding to a cross section 4-4 of FIG. 3. Line 402 represents the probability of arrival along the route of travel. Plot 400 is oversimplified and meant as an illustrative graphical representation of the model. The timing and frequency of stochastic occurrence of energy depletion events affects the energy consumption along the route. The profile is multi-modal and would often have more complex shapes than those depicted in FIG. 4. Also, while the plot is shown having symmetry in the schematic of FIG. 4, it is understood that the energy consumption varies depending on the direction of travel relative to the vehicle's current location, based on the terrain and depletion events tied to geographic location. Therefore a plot showing the probability of arrival would likely be asymmetric relative to the current location.

Line 404 represents the current location of the vehicle. As the vehicle travels, energy is depleted and the possibility of going further is reduced. At center portion 406 of the plot, the arrival probability is very high, and approaches 100 percent. The outer edges of the center portion 406 are shown as lines 408 and 410, which correspond to the high confidence inner contour line of the geographical map discussed above. As the vehicle travels further from the current location, the number of stochastic energy depletion events accumulates. Both of the arrival probability as well as the estimate confidence is reduced. In each of the outer portions 412 and 414, the lowered arrival probability is shown with accompanying confidence bands 416. It should be noted that the width between the bands increases as distance is further from the current location. The outer portions 412 and 414 correspond to the shaded areas discussed earlier in reference to the geographical map. At the outer fringes of the outer portions, lines 418 and 420 correspond to the low confidence band discussed earlier in reference to the geographic map. Substantially all energy stored within the battery is depleted prior to the vehicle arriving at geographic destinations outside of the low confidence band.

Figure 5:
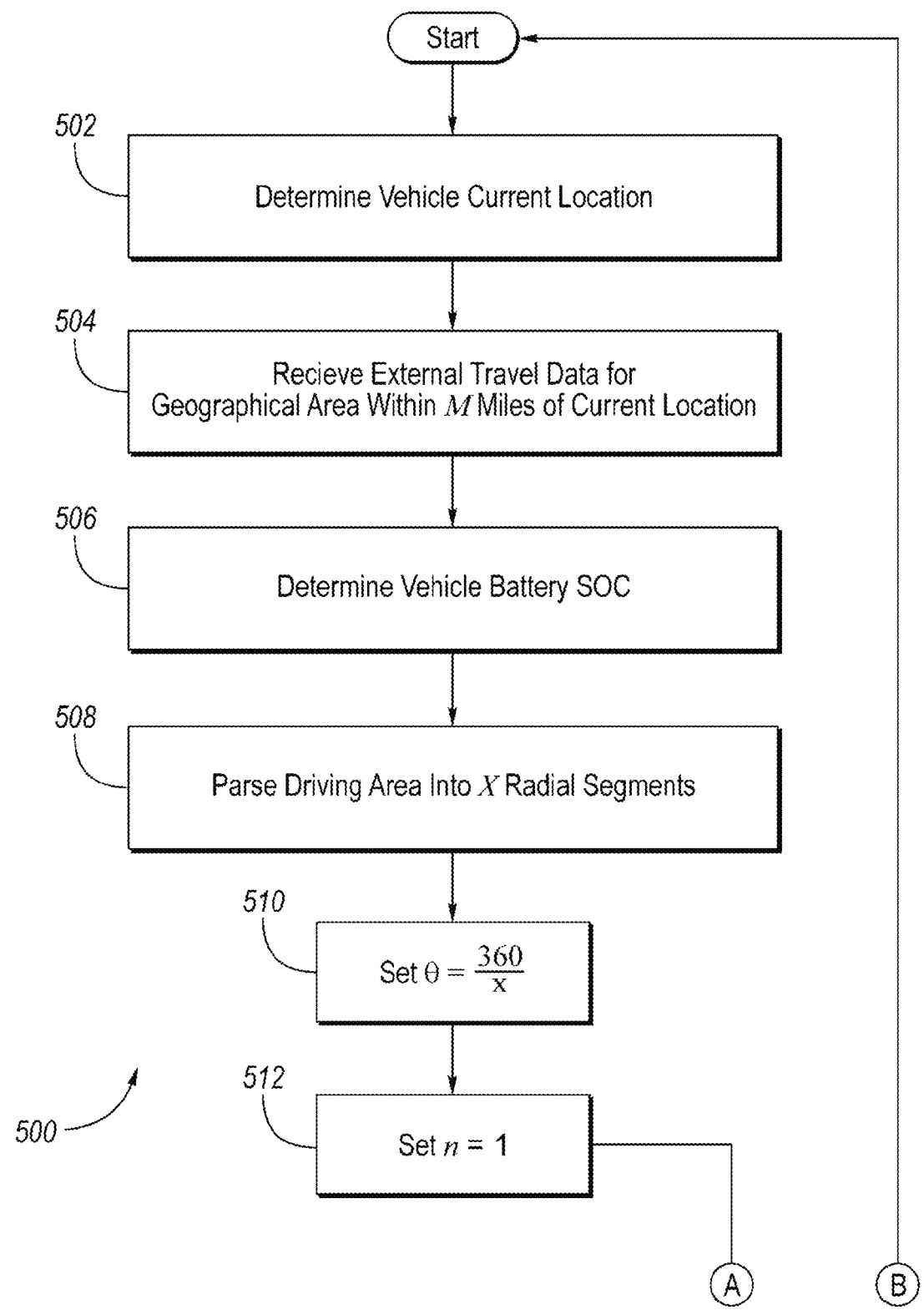
FIG. 5 is a flow chart of a method of driving range estimation.
Figure 5:
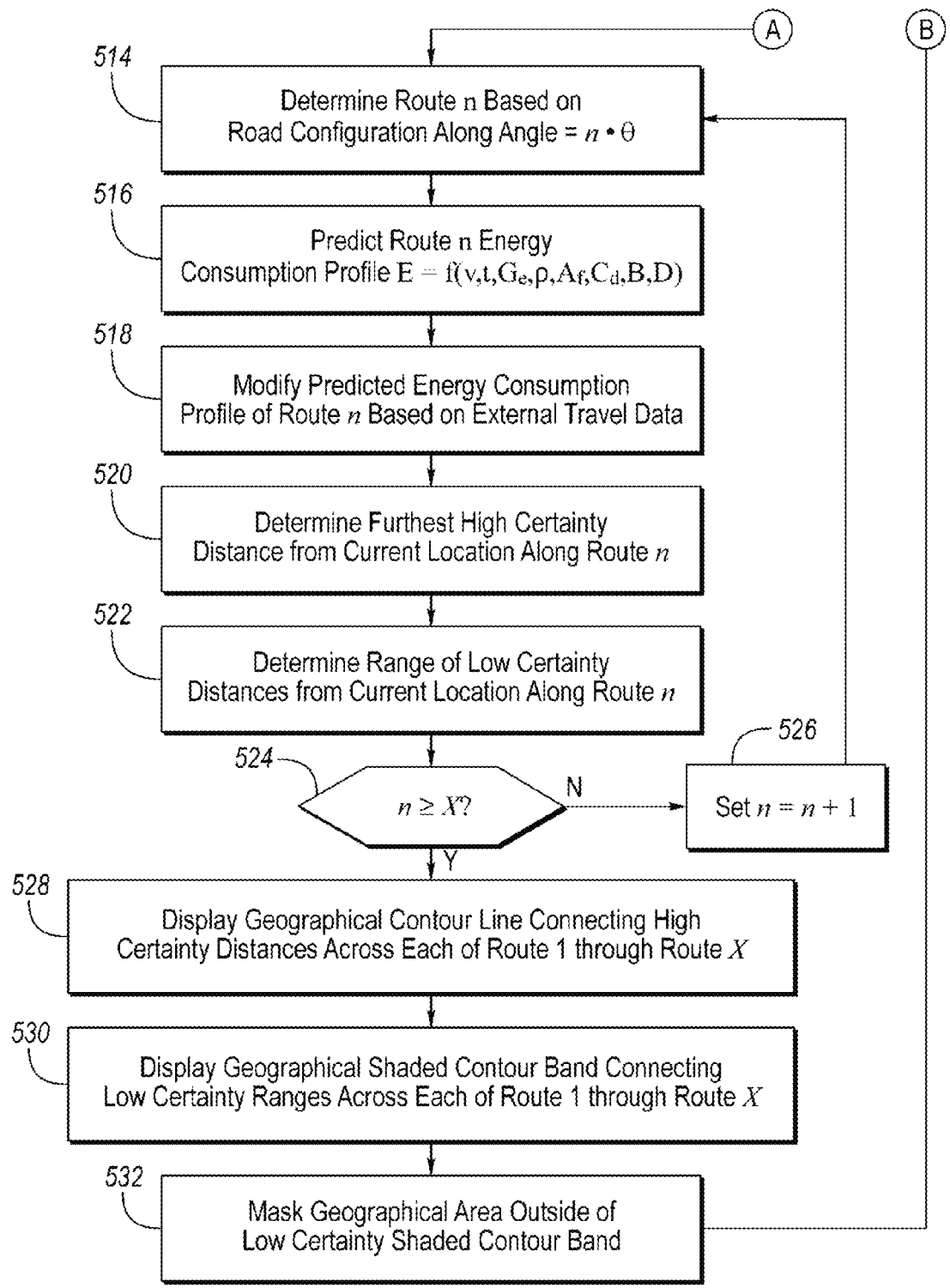

FIG. 5 is a flowchart of a method 500 according to the present disclosure. At step 502 the controller determines the current location of the vehicle. For example, the vehicle controller may employ GPS features. At step 504, the controller polls external sources for available data concerning local travel conditions. As discussed above, the external data may be from other vehicles indicating other vehicle speeds, traffic, weather, and other factors in the vicinity of the corresponding vehicle. Alternatively, an external server may broadcast relevant travel data to the subject vehicle, for example, such as a traffic database or a weather database. In at least one embodiment, the data is limited to a local area within M miles from the current location.

At step 506 the controller determines the amount of energy currently stored in the traction battery. In one example, state of charge (SOC) is used as an indicator of the energy stored in the battery.

At step 508 the driving area surrounding the vehicle is parsed into a number of radial segments. In the example provided, the segments are equal in width and correspond to an angle θ. At step 510, the angle θ is determined by dividing 360 degrees into X equal segments. Although the segments are described as being equally distributed, it is contemplated that other segmentation techniques may be used. For example the area surrounding the vehicle may be divided by the particular road geometry near the current location. In this way certain portions of the area surrounding the current location may be more or less dense depending on the actual available routes.

Each of the segments corresponds to a particular route on the geographical map. At step 512 a counter n is set to 1 to account for the computations performed by the controller for the route in each segment. At step 514 the controller establishes the particular route that is closest to a reference angle equal to n·θ. Since the local road arrangement is unlikely in a straight line, Route n corresponding to the direction of the reference angle will conform to the closest path available based on the actual road layout.

At step 516 the controller predicts the energy consumption profile along Route n according to one or more methods discussed above. The energy consumption profile is based on a number of inputs corresponding to the vehicle and the road path. For example the predicted velocity profile, the curb weight status of the vehicle, as well as predicted profiles for t, $G_e$, A, B, and D discussed above in reference to equation (1).

At step 518 the controller accounts for any real time data received from external sources. The real time data may correspond to stochastic variation such as traffic status which may force deviations in speed from the normal flow of traffic, such as gridlock or accidents. Also, a weather status including at least one of air density, wind speed, wind direction, precipitation, and ambient temperature may be communicated to the controller to inform the weather conditions at other locations. Further, vehicle to vehicle dynamic interactions may be observed through V2V communication. The predicted energy consumption profile is updated based on the current travel data.

At step 520 the controller determines the furthest available driving distance from the current location based on the energy stored within the battery and the updated predicted energy consumption associated with driving along Route n. Initially, a high certainty distance is calculated having a confidence of at least about 99 percent. Although this value is provided as an example threshold, other probability values may be suitable to operate as a high certainty threshold.

At step 522 the controller determines the furthest available driving distances along Route n corresponding to lesser confidence values. As discussed above, it may be useful to calculate ranges using the lower certainty values as opposed to a single value. In at least one embodiment, the controller determines a range of low certainty distances from current location along Route n.

At step 524 the controller determines whether all segments of the area surrounding the current location have been assigned a route. If at step 524 the value of the counter n is less than the total number of segments X, the controller increments n at step 526 by increasing the previous value by one, and returns to step 514 to analyze the next segment.

If at step 524 the value of the counter n is greater than or equal to the total number of segments X, the controller constructs various geographical contours using the high certainty and lower certainty distances. At step 528, the controller displays a geographical inner contour line connecting the high certainty distances across each Route n, where the value of n ranges between one up to the total number of segments X. The inner high confidence line may be a solid line, and the vehicle has a substantially certain probability of arriving at geographic destinations within the contour line using the energy stored in the battery.

At step 530 the controller displays a contour band connecting the low certainty distance ranges across each Route n, where the value of n ranges between one up to the total number of segments X. The contour band may have a width that corresponds to an associated confidence level of each Route n. The outer low confidence band is further from the current location and tends to depict the fringes of vehicle driving distance capability based on the current charge. Additionally, the contour band may have surrounding shading depicting confidence of the low certainty distance ranges. At step 532 the controller may mask a geographical area of the map that are outside of the low certainty shaded areas of the contour band.

Method 500 may be continuously performed to update the range contours as driving occurs. As vehicle operating conditions vary, as well as new data is received from external sources, the model is updated. In this way the geographical map is refreshed with the latest available information, and the contours may be more accurate.

The present disclosure provides representative control strategies and/or logic that may be implemented using one or more processing strategies such as event-driven, interrupt-driven, multi-tasking, multi-threading, and the like. As such, various steps or functions illustrated herein may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but it is provided for ease of illustration and description.

The control logic may be implemented primarily in software executed by a microprocessor-based vehicle, engine, and/or powertrain controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle system comprising:
a vehicle controller programmed to:
generate route endpoints from predicted energy consumption rates such that predicted energy consumptions are different for same length routes,
display a first contour line connecting endpoints having higher certainty and a second contour line connecting endpoints having lower certainty to indicate achievable variable certainty driving ranges, and
mask areas radially outside the second contour line to obscure unachievable driving ranges and prevent driver distraction.

2. The vehicle system of claim 1 wherein the first contour line comprises an inner high confidence line representing at least about 99 percent confidence that energy stored within a battery is sufficient to propel a vehicle to geographic destinations within the high confidence line.

3. The vehicle system of claim 1 wherein the second contour line comprises an outer low confidence band representing from about 80 percent to about 90 percent confidence that substantially all energy stored within a battery is depleted prior to a vehicle arriving at geographic destinations outside of the low confidence band.

4. The vehicle system of claim 1 wherein the predicted energy consumption rates are based on energy depletion events that include a change in a predicted velocity profile.

5. The vehicle system of claim 1 wherein the predicted energy consumption rates are based on energy depletion events that include an aerodynamic drag status based on data communicated from external sources.

6. The vehicle system of claim 1 wherein the predicted energy consumption rates are based on energy depletion events that include a weather status based on air density, wind speed, wind direction, precipitation, or ambient temperature.

7. The vehicle system of claim 1 wherein the predicted energy consumption rates are based on energy depletion events that include a curb weight status based on vehicle mass, passenger mass, and cargo mass.

8. A method of estimating a vehicle driving distance comprising:
by a vehicle controller,
generating route endpoints from predicted energy consumption rates such that predicted energy consumptions are different for same length routes,
displaying a first contour line connecting endpoints having higher certainty, and a second contour line connecting endpoints having lower certainty to indicate achievable variable certainty driving ranges, and
masking areas radially outside the second contour line to obscure unachievable driving ranges and preventing driver distraction.

9. The method of claim 8, wherein the first contour line comprises an inner high confidence line representing at least about 99 percent confidence that energy stored within a battery is sufficient to propel a vehicle to geographic destinations within the high confidence line.

10. The method of claim 8 wherein the second contour line comprises an outer low confidence band representing from about 80 percent to about 90 percent confidence that substantially all energy stored within a battery is depleted prior to a vehicle arriving at geographic destinations outside of the low confidence band.

11. The method of claim 8 wherein the predicted energy consumption rates are based on energy depletion events that include a change in a predicted velocity profile.

12. The method of claim 8 wherein the predicted energy consumption rates are based on energy depletion events that include an aerodynamic drag status based on data communicated from external sources.

* * * * *